United States Patent
Ting et al.

(10) Patent No.: US 10,451,014 B2
(45) Date of Patent: Oct. 22, 2019

(54) NOZZLE COMBUSTION SHIELD

(71) Applicant: CUMMINS INC., Columbus, IN (US)

(72) Inventors: Darren Ting, Columbus, IN (US); Patrick M. Pierz, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/573,527

(22) PCT Filed: Jun. 30, 2015

(86) PCT No.: PCT/US2015/038597
§ 371 (c)(1),
(2) Date: Nov. 13, 2017

(87) PCT Pub. No.: WO2017/003460
PCT Pub. Date: Jan. 5, 2017

(65) Prior Publication Data
US 2018/0149125 A1    May 31, 2018

(51) Int. Cl.
  *F02M 53/04*    (2006.01)
  *F02B 19/12*    (2006.01)
  (Continued)

(52) U.S. Cl.
  CPC ............. *F02M 53/046* (2013.01); *F01P 3/02* (2013.01); *F01P 3/16* (2013.01); *F02B 19/108* (2013.01);
  (Continued)

(58) Field of Classification Search
  CPC .... F02B 1/05; F02B 5/12; F02B 19/00; F02B 19/108; F02B 19/1085; F02B 19/14;
  (Continued)

(56) References Cited

U.S. PATENT DOCUMENTS 2,080,189 A   5/1937   Schwaiger
2,719,514 A   10/1955  Schilling
(Continued)

FOREIGN PATENT DOCUMENTS

DE   3819220 A1   12/1988
EP   0 588 777    3/1994
(Continued)

OTHER PUBLICATIONS

KR 10-2011-0053049; Kim et al, Hyundai Heavy Industries, Feb. 5, 2014, English translation.*
(Continued)

*Primary Examiner* — Erick R Solis
(74) *Attorney, Agent, or Firm* — Faegre Baker Daniels LLP (57) ABSTRACT

An apparatus and method are disclosed for an injector assembly including an injector tip having a prechamber, such as a permanent, passive prechamber (PPPC), and a nozzle combustion shield (NCS) to mitigate pre-ignition events, such as knocking, caused by overheating of the prechamber. The NCS has a thermal conductivity greater than the injector tip. The NCS optionally includes a barrel forming a slip fit with the cylinder head bore and forming a press fit with the injector tip. The NCS also optionally includes a brim to form a combustion seal with a cylinder head. As the spark plug ignites a fuel charge in the prechamber, heat is absorbed into the injector tip, flows into the NCS barrel, out of the NCS brim, and into the cylinder head for cooling via a cooling jacket.

22 Claims, 7 Drawing Sheets

(51) Int. Cl.
  *F02B 19/18* (2006.01)
  *F02M 21/02* (2006.01)
  *F02M 61/14* (2006.01)
  *F01P 3/02* (2006.01)
  *F01P 3/16* (2006.01)
  *F02B 19/10* (2006.01)
  *F02B 19/00* (2006.01)

(52) U.S. Cl.
  CPC .............. *F02B 19/12* (2013.01); *F02B 19/18* (2013.01); *F02M 21/0215* (2013.01); *F02M 21/0278* (2013.01); *F02M 53/043* (2013.01); *F02M 61/14* (2013.01); *F01P 2003/024* (2013.01); *F02B 2019/006* (2013.01); *F02M 2200/8061* (2013.01); *F02M 2200/858* (2013.01); *F02M 2200/9053* (2013.01); *Y02T 10/125* (2013.01); *Y02T 10/32* (2013.01)

(58) Field of Classification Search
  CPC . F02B 19/16; F02B 2019/006; F02M 53/046; F02M 61/14; H01T 13/54
  USPC .................................. 123/209, 254, 268, 275
  See application file for complete search history.

(56) References Cited

U.S. PATENT DOCUMENTS

| | | |
|---|---|---|
| 4,770,138 A | 9/1988 | Onishi |
| 4,834,042 A | 5/1989 | Wakasa et al. |
| 5,492,573 A | 2/1996 | Fukushima et al. |
| 6,119,658 A | 9/2000 | Jehle et al. |
| 6,843,220 B2 | 1/2005 | Lausch et al. |
| 9,371,771 B2 | 6/2016 | Lee et al. |
| 2009/0133667 A1 | 5/2009 | Inoue et al. |
| 2014/0165958 A1 | 6/2014 | Lee et al. |
| 2014/0209057 A1* | 7/2014 | Pouring .................. F02B 19/12 123/257 |
| 2016/0195003 A1* | 7/2016 | Konczol ................. F02B 19/12 123/253 |
| 2016/0348570 A1* | 12/2016 | Willi ....................... F02B 19/18 |

FOREIGN PATENT DOCUMENTS

| | | |
|---|---|---|
| EP | 1411221 | 4/2004 |
| EP | 1936144 A1 | 6/2008 |
| EP | 2735717 A2 | 5/2014 |
| GB | 424 417 | 12/1932 |
| GB | 699 484 | 11/1953 |
| KR | 2011053049 | 5/2011 |
| WO | 2011104430 | 9/2011 |
| WO | 2012138373 | 10/2012 |

OTHER PUBLICATIONS

Oxygen-free Copper' Wikipedia [online]. Mar. 20, 2015. [retrieved on Mar. 9, 2015]. Retrieved from the Internet. <URL: http://en.wikipedia.org/wiki/Oxygen-free_copper>.

International Search Report and Written Opinion dated Oct. 1, 2015 in PCT/US2015/038597.

International Preliminary Report on Patentability dated Jun. 30, 2017 in PCT/US2015/038597.

Supplemental European Search Report issued by the European Patent Office, Munich, dated Oct. 17, 2018, for related Application No. EP15897340; 7 pages.

* cited by examiner

NOZZLE COMBUSTION SHIELD

CROSS-REFERENCE TO RELATED APPLICATIONS

The present application is a national stage application of International (PCT) Patent Application Serial No. PCT/US2015/038597, filed on Jun. 30, 2015, the complete disclosure of which is expressly incorporated by reference herein.

TECHNICAL FIELD

The present disclosure relates to internal combustion engines. In particular, the present disclosure relates to managing the temperature of a fuel injector of a spark-ignition engine.

BACKGROUND

Various spark-ignition engines include injector assemblies with a prechamber, which is sometimes formed as a separately defined volume from a main combustion chamber to ignite a fuel charge when in use. The prechamber improves combustion characteristics by defining the ignition wave front with apertures formed in the injector tip. The injector tip is sometimes threaded and screwed into the cylinder head to hold it in place. The threads also serve to transfer heat from the injector tip into the cylinder head. Adequate heat transfer acts to mitigate harmful pre-ignition events, such as knocking. However, after extended usage, a threaded injector tip can seize up and become difficult to remove for service. Sometimes a major drilling operation is required to remove the injector assembly from the cylinder head. There exists a continuing need for spark-ignition engine designs to facilitate serviceability of the injector assembly while managing temperature by providing adequate cooling to prevent harmful pre-ignition events.

SUMMARY

Aspects of various embodiments relate to an assembly, comprising an injector tip and a nozzle combustion shield (NCS). The injector tip includes a prechamber and at least a portion of a chamber housing. The prechamber is defined by at least the portion of the chamber housing. The NCS includes an inner surface and an outer surface. The NCS inner surface is in a press fit configuration with the chamber housing. The chamber housing has a first thermal conductivity. The NCS has a second thermal conductivity greater than the first thermal conductivity of the chamber housing.

Some embodiments relate to an assembly comprising an injector tip including a prechamber, the injector tip having a first thermal conductivity; an NCS in a non-threaded press fit configuration with the injector tip, wherein the NCS has a second thermal conductivity is greater than the first thermal conductivity of the injector tip; and a cylinder head including a bore and a proximal surface, at least a portion of the NCS received in the cylinder head bore, the NCS being in a slip fit configuration with the cylinder head, wherein the NCS is in direct contact with the proximal surface.

Yet further embodiments relate to a method, comprising: providing an injector tip having a prechamber and a first thermal conductivity; providing an NCS including a barrel and a brim, the NCS having a second thermal conductivity greater than the first thermal conductivity of the injector tip; and fitting an NCS to the injector tip in a press fit configuration to form an injector assembly.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 1:
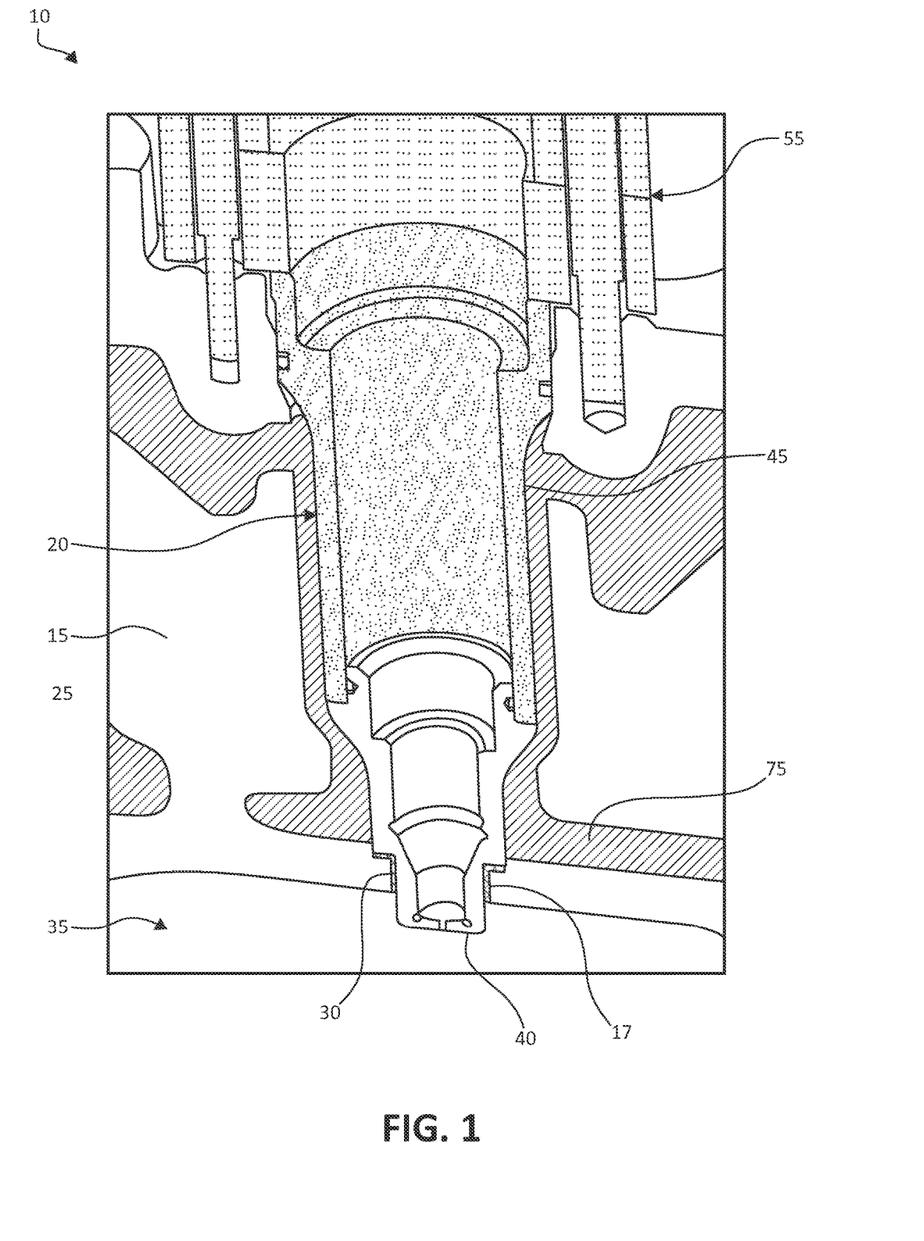
FIG. 1 is a partial cutaway perspective view of a cylinder including injector assembly having a chamber housing and a nozzle combustion shield (NCS), according to some embodiments.
Figure 2:
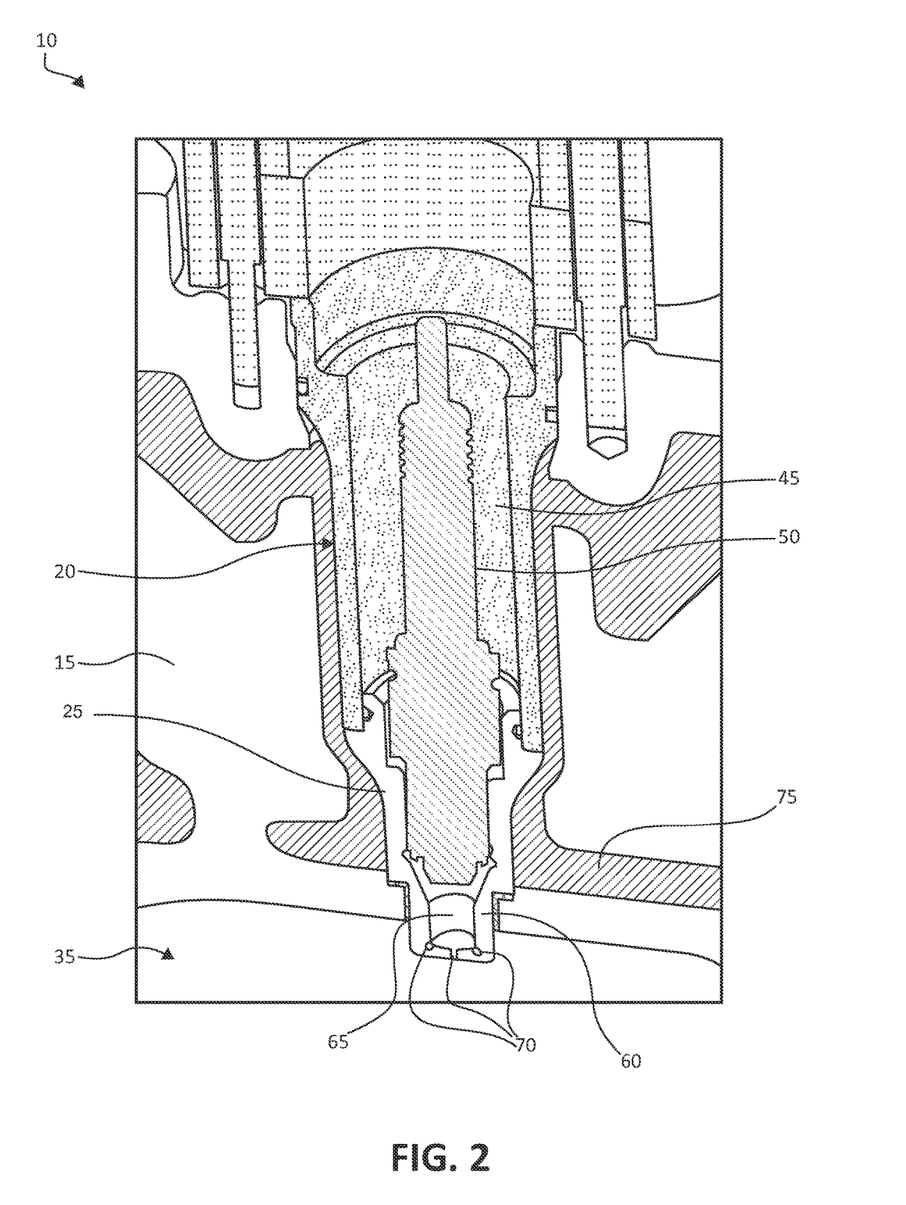
FIG. 2 is another partial cutaway perspective view of the cylinder of FIG. 1 showing a spark plug, according to some embodiments.
Figure 3:
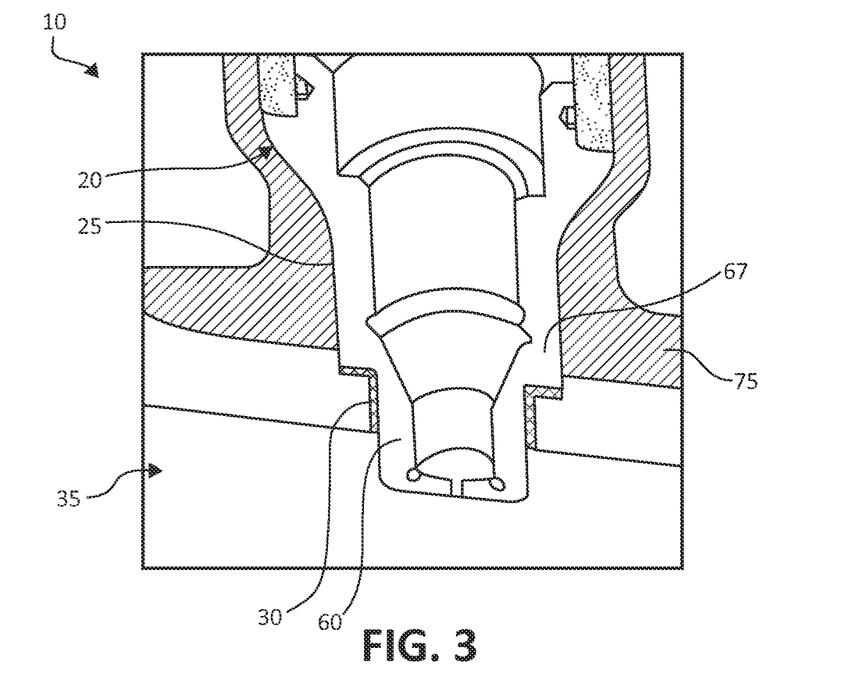
FIG. 3 is yet another partial cutaway perspective view of the cylinder of FIG. 1 showing the injector tip, according to some embodiments.
Figure 4:
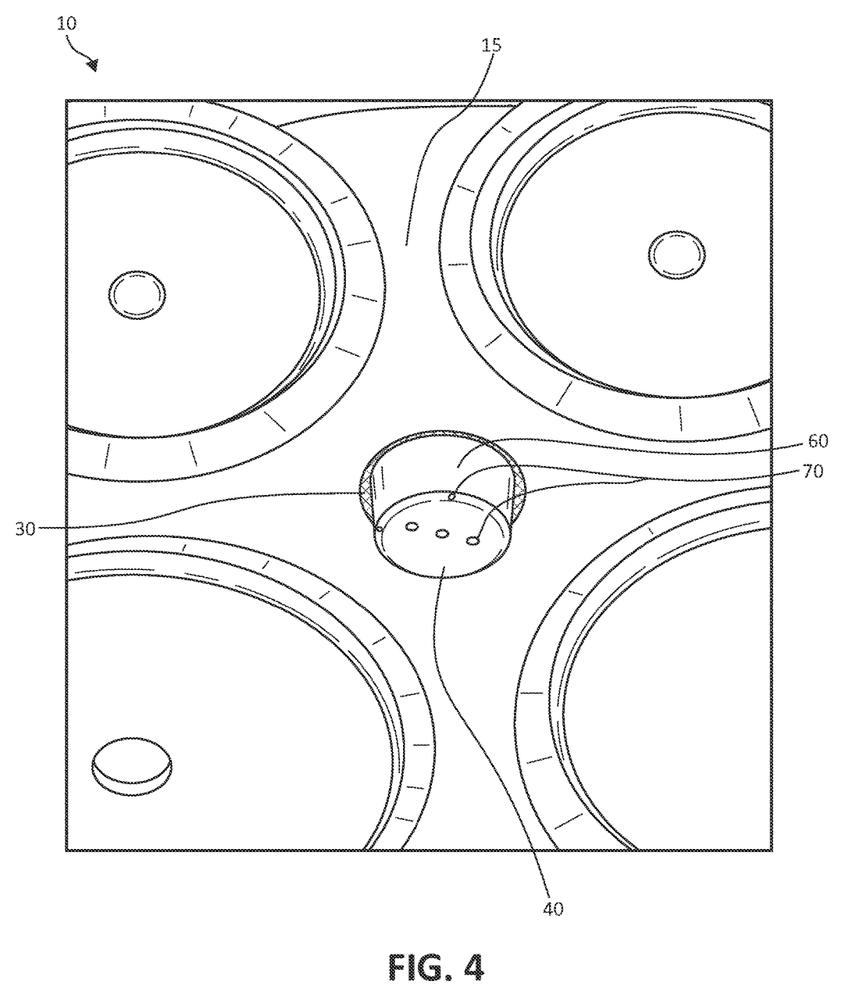
FIG. 4 is a perspective view of the cylinder of FIG. 1 from the combustion chamber, according to some embodiments.

FIGS. 1-4 are various partial views of an assembled cylinder 10 of an internal combustion engine according to some embodiments. The example internal combustion engine is a spark-ignited internal combustion engine, such as a natural gas engine, a multi-fuel engine, or other suitable spark-ignited internal combustion engine. FIG. 1 is a partial cutaway perspective view of the cylinder 10 including an injector assembly 20 having a chamber housing 25 and a nozzle combustion shield (NCS) 30, according to some embodiments, and schematically showing the space defined by the injector assembly. FIG. 2 is another partial cutaway perspective view of the cylinder 10 schematically showing a spark plug 50 positioned with the chamber housing 25, according to some embodiments and schematically showing the space defined by the injector assembly. FIG. 3 is yet another partial cutaway view of the cylinder 10 showing the injector tip 60, according to some embodiments and schematically showing the space defined by the injector assembly. FIG. 4 is a perspective view of the cylinder 10 from the combustion chamber 35, according to some embodiments.

The portion of the cylinder head 15 is shown disposed above a combustion chamber 35 of example cylinder 10.

Figure 7:
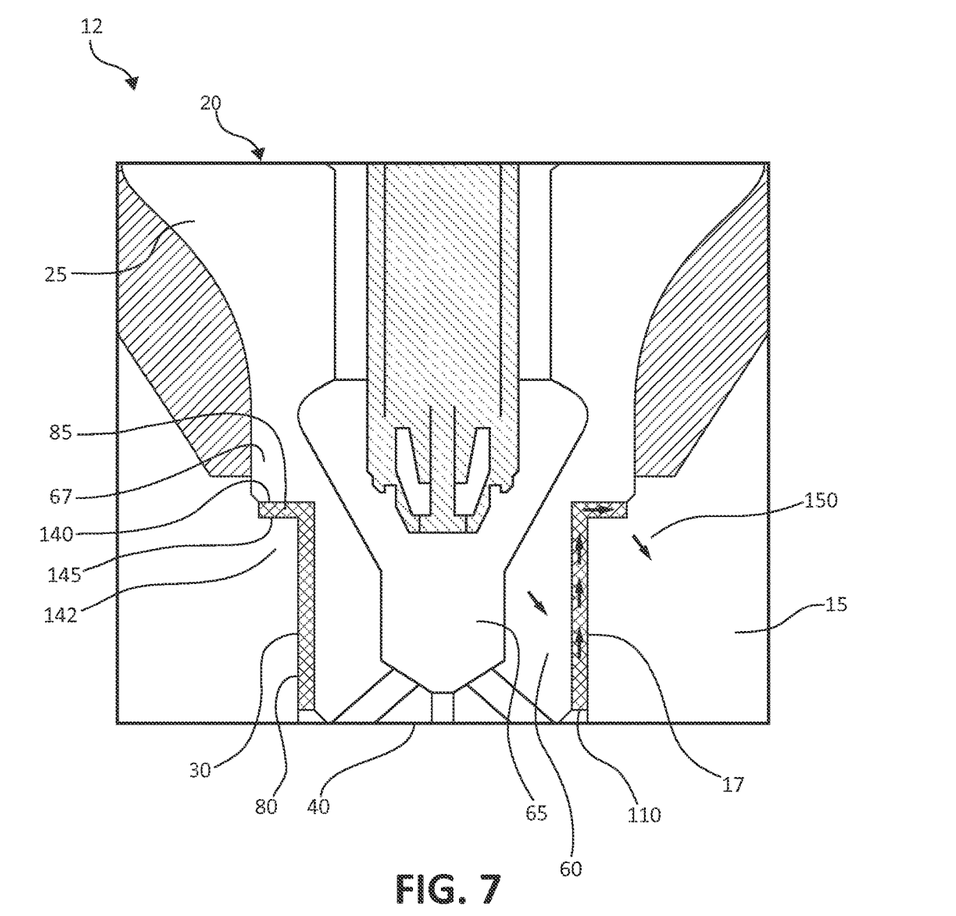
FIG. 7 is a partial cross-sectional schematic illustration of another cylinder similar to the cylinder of FIG. 1 showing detail of the injector tip, according to some embodiments.

The example injector assembly 20 is disposed partially in the cylinder head 15, and the cylinder head 15 includes a bore 17. A distal end 40 of the example injector assembly 20 optionally protrudes into the combustion chamber 35 from the bore 17. In some embodiments, the distal end 40 of the injector assembly 20 does not protrude into the combustion chamber 35. For example, the distal surface of the distal end 40 would be flush with the cylinder head 15 (FIG. 7). In various embodiments, the cylinder head 15 is formed of iron, steel, or another suitable iron alloy.

The example chamber housing 25 is a lower portion or housing of the injector assembly 20. As shown, the chamber housing 25 engages the cylinder head 15. In some embodiments, the chamber housing 25 is formed of stainless steel or another suitable iron alloy.

The example injector assembly 20 includes a spark plug housing 45 and a spark plug 50. The example spark plug housing 45 engages the chamber housing 25. The example spark plug housing 45 is an upper portion or housing of the injector assembly 20. In some embodiments, the spark plug housing 45 is formed of steel or other suitable iron alloy.

The example spark plug housing 45 is engaged and compressed by a coupling assembly 55. The example coupling assembly 55 includes one or more studs (or screws) and a cap to provide a force to retain (or clamp) the injector assembly 20 on the cylinder head 15. Perhaps as best shown in FIG. 2, the example spark plug 50 is disposed partially in the spark plug housing 45 and partially in the chamber housing 25.

The injector assembly 20 includes an injector tip 60. The injector tip 60 is generally defined as the portion of the injector assembly 20 between the spark plug 50 and the combustion chamber 35. Generally, the prechamber 65 is the volume formed in the chamber housing 25 in the injector tip 60. The example prechamber 65 is an integrated or integral passive prechamber, which is optionally permanent. As an alternative to or in addition to the injector tip 60 being defined by the position of the spark plug 50, the injector tip 60 is defined as the portion of the injector assembly 20 extending from the shoulder 67 of the chamber housing 25.

One or more injector apertures 70 are formed in the chamber housing 25 at the injector tip 60. The injector apertures 70 facilitate fluid communication between the prechamber 65 and the combustion chamber 35. In particular, the injector apertures 70 allow fuel charge (e.g., a pre-mixed fuel and air charge) to flow into the prechamber 65 during operation of the internal combustion engine, such as during the intake and compression stages of a four-stroke cycle. Perhaps as best seen in FIG. 4, the injector apertures 70 are relatively small with respect to the injector tip 60. However, other sizes of injector apertures 70 or other apertures in the injector tip 60 are contemplated for fluid communication with the combustion chamber 35.

When the cylinder 10 is in use, a fuel charge flowing into the prechamber 65 is optionally ignited by the spark plug 50, which starts combustion in the prechamber 65 (e.g., beginning a power stroke). The combustion flows out of the injector apertures 70 and into the combustion chamber 35 for the main combustion portion of a power stroke. In this manner, the prechamber 65 facilitates a controlled combustion or burn. As a result of its use, the injector tip 60 is exposed to the extreme temperatures of combustion, and often, the injector tip 60 absorbs excess heat from combustion. Too much heat in the injector tip 60 may cause pre-ignition of the fuel charge (e.g., pre-ignition events or knocking), which may damage the internal combustion engine.

The example cylinder 10 and cylinder head 15 are designed to be cooled to reduce heat build-up from combustion. For example, a cooling jacket 75 is formed in the example cylinder head 15. When in use, a coolant optionally flows through cooling jacket 75 to cool (e.g., move heat away from) components therein.

Due to being exposed to combustion, the injector assembly 20 often requires particular cooling considerations. For example, the injector assembly 20 has limited surface area contact with the coolant. The example injector tip 60 is not in direct contact with the cooling jacket 75. This is at least partly due to requirements for the cylinder head 15 to have material adjacent to the combustion chamber 35 to define the combustion chamber 35 separate from the cooling jacket 75, and which is also sufficient to withstand combustion forces. Additionally, the heat transfer path from the chamber housing 25 directly to the coolant in the cooling jacket 75 is sometimes insufficient to cool the injector tip 60 and prevent pre-ignition. At times, this is partly due to the chamber housing 25 being formed of a material having desirable properties for withstanding combustion, but having an insufficient thermal conductivity (e.g., steel).

Figure 5:
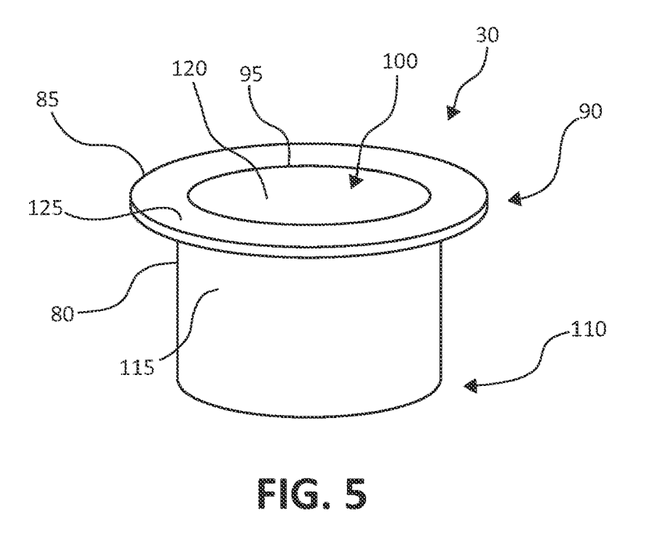
FIG. 5 is an overhead perspective view of the NCS, according to some embodiments.
Figure 6:
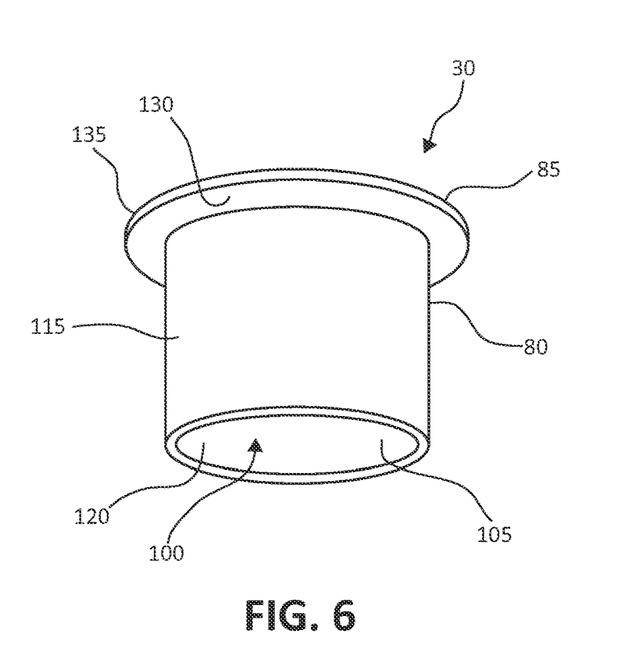
FIG. 6 is an underside perspective view of the NCS, according to some embodiments.

Embodiments of the present disclosure provide a separate heat transfer path for removing heat from the injector tip 60. A cross-sectional view of the NCS 30 is shown in FIGS. 1-3 (related perspective views are shown in FIGS. 4-6). Heat in the injector tip 60 is transferred to the NCS 30 and into the cylinder head 15. Details of the configuration of the NCS 30 itself and the NCS 30 as part of the injector assembly are described herein.

FIGS. 5-6 are overhead and underside perspective views, respectively, showing an example NCS 30 in isolation, according to some embodiments. The NCS 30 includes a barrel 80 and a brim 85. The example brim 85 extends outwardly from the barrel 80. In particular, the example brim 85 extends from the proximal end 90 of the NCS 30. An opening 95 is formed at the proximal end 90 of the NCS 30. A conduit 100 extends from the proximal end opening 95 to an opening 105 formed in the distal end 110 of the NCS 30. The example conduit 100 extends through the barrel 80 and the brim 85.

The example NCS 30 is symmetrical. The example barrel 80 is in the shape of a cylinder having constant diameter. Other shapes may be selected to conform to the shape of the chamber housing 25 (e.g., at the injector tip 60) and the cylinder head 15. The example barrel 80 extends from the proximal end 90 to the distal end 110 of the NCS 30. The example NCS 30 has an outer surface 115 and an inner surface 120 generally along the barrel 80.

The example brim 85 is in the shape of a flat ring having constant diameter. Other shapes may be selected to conform to the chamber housing 25 (e.g., at the injector tip 60) and the cylinder head 15. The example brim 85 extends from the barrel 80 to an outer edge 135 of the NCS 30. The example NCS 30 has an upper surface 125 and a lower surface 130 generally along the brim 85. The presence of a brim 85 provides additional surface area in contact with the cylinder head 15 (FIG. 1) for the transfer of heat thereto.

Generally, the NCS 30 has a thermal conductivity that is greater than the thermal conductivity of the chamber housing 25, in particular at the injector tip 60. In some embodiments, the NCS 30 comprises a copper material. In various embodiments, the example NCS 30 is formed of a copper alloy material. Non-limiting examples of copper alloy material include a copper-zirconium alloy, a C15000 alloy, or a C10200 alloy. In further embodiments, the NCS 30 is formed of multiple materials and may utilize different materials for the brim and the barrel, for example.

FIG. 7 is a partial cross-sectional schematic illustration showing an example cylinder 12 including the NCS 30 assembled with a cylinder head 15 and a chamber housing 25 and an example flow of heat or heat transfer path 150 when in use according to some embodiments. In the illustrated embodiment, the example cylinder 12 is similar to example cylinder 10, except that the example cylinder 12 sets the injector assembly distal end 40 is flush with the cylinder head 15. The same numbering is used for these similar elements for both cylinders 10 and 12.

When assembled, the NCS 30 engages the chamber housing 25 and the cylinder head 15 along the brim 85 of the NCS. The chamber housing 25 includes a shoulder 67 providing a distal surface 140. The example distal surface 140 is flat for cooperatively engaging the example upper surface 125 of the NCS 30. When assembled, forces from the example coupling assembly 55 (shown in FIG. 1) press the distal surface 140 of the chamber housing 25 onto the brim 85 of the NCS 30, optionally forming a combustion seal should the combustion approach the distal surface 140 of the chamber housing 25.

The cylinder head 15 includes a shoulder 142 providing a proximal surface 145. The example shoulder 142 also facilitates limiting axial movement of the injector assembly 20 relative to the cylinder head 15 (example cylinder 10 as shown in FIGS. 1-4 utilizes the same cylinder head shoulder). The example proximal surface 145 is flat for cooperatively engaging the example lower surface 130 of the NCS 30. When assembled and the chamber housing 25 is pressed by the coupling assembly 55 (shown in FIG. 1), the proximal surface 145 engages the lower surface 130 of the NCS 30 and a combustion seal is formed. The combustion seal prevents the combustion in the combustion chamber 35 (FIG. 1) from flowing beyond the brim 85 of the NCS 30, or the outer edge 135 of the NCS, should the combustion flames approach the proximal surface 145 of the cylinder head 15.

When assembled, the example NCS 30 also engages the chamber housing 25 and the cylinder head 15 along the barrel 80 of the NCS. The example barrel 80 wraps around the circumference of the chamber housing 25 at the injector tip 60. In particular, the example inner surface 120 of the NCS 30 is engaged with the chamber housing 25 in a press fit configuration, which utilizes proper sizing and shape to facilitate a frictional interference fit. The press fit configuration limits movement of the NCS 30 on the chamber housing 25. An example press fit configuration limits one or more of rotational, lateral, and axial movements of the NCS 30 with respect to the chamber housing 25.

The press fit configuration has several advantages. For example, the press fit configuration increases contact and reduces air pockets, which can limit heat transfer from the chamber housing 25 to the NCS 30. In addition, the press fit configuration mitigates the flow of combustion between the chamber housing 25 and the NCS 30. Furthermore, the press fit configuration is an alternative to a threaded engagement, which is susceptible to seizing upon removal. For example, after being press fit onto the chamber housing 25, the NCS 30 may optionally be removed from the chamber housing 25 at the injector tip 60. In some instances, for example, the NCS 30 is configured to be cut to be removed. In various instances, the NCS 30 is configured to be clamped and pulled off.

The example barrel 80 of the NCS 30 is disposed in the bore 17 of the cylinder head 15 and is surrounded by the cylinder head 15. The example outer surface 115 of the NCS 30 is engaged with the cylinder head 15 in a slip fit configuration, which limits movement of the NCS in the bore 17 of the cylinder head 15. An example slip fit configuration generally limits lateral movement, but does not generally limit axial and/or rotational movement of the NCS 30 with respect to the cylinder head 15. Generally, a slip fit configuration utilizes proper sizing and shape to facilitate less frictional interference than a press fit configuration. The slip fit configuration also facilitates ease of installation, maintenance, and repair of the example cylinder 12 as an alternative to a threaded engagement.

Generally, the distal end 110 of the NCS 30 does not extend beyond the cylinder head 15. As shown in FIG. 7, the distal end 110 ends where the injector tip 60 begins to taper.

Heat transfer path 150 is schematically illustrated to show the movement of heat when the example cylinder 12 is in use (which would be similar for cylinder 10, as well). Heat generated by the combustion event in the prechamber 65 is transferred into the chamber housing 25. The heat then travels through the chamber housing 25 to the barrel 80 of the NCS 30 through the press fit interface between the chamber housing and the barrel. The NCS 30 transfers the heat toward the brim 85 of the NCS 30. Heat is transferred out of the brim 85 and into the cylinder head 15. Although not shown, the cylinder head 15, which has a greater surface area than the injector assembly 20 for interfacing with the coolant, is cooled by the coolant flowing in the cooling jacket 75.

Due to the slip fit configuration between the barrel 80 of the NCS 30 and the cylinder head 15 versus the press fit configuration between the brim 85 of the NCS 30 and the cylinder head 15, a majority of the heat moves through the brim 85 to the cylinder head 15. In the example cylinders 10 and 12, the coolant is not in direct contact with the brim 85. However, in other embodiments (not shown), the coolant is in contact with the brim 85 of the NCS 30 to provide an additional pathway for heat transfer. In such embodiments, the heat transfer pathway from the NCS 30 directly to the coolant may be a minor or major pathway for heat transfer relative to the heat transfer pathway from the NCS 30 to the cylinder head 15.

In this manner, the injector assembly 20 including the NCS 30 provides sufficient cooling to mitigate pre-ignition events caused by overheating of a prechamber during use. In addition, the injector assembly 20 is easily serviced due to being free of threaded engagements (e.g., having no threaded engagements).

Figure 8:
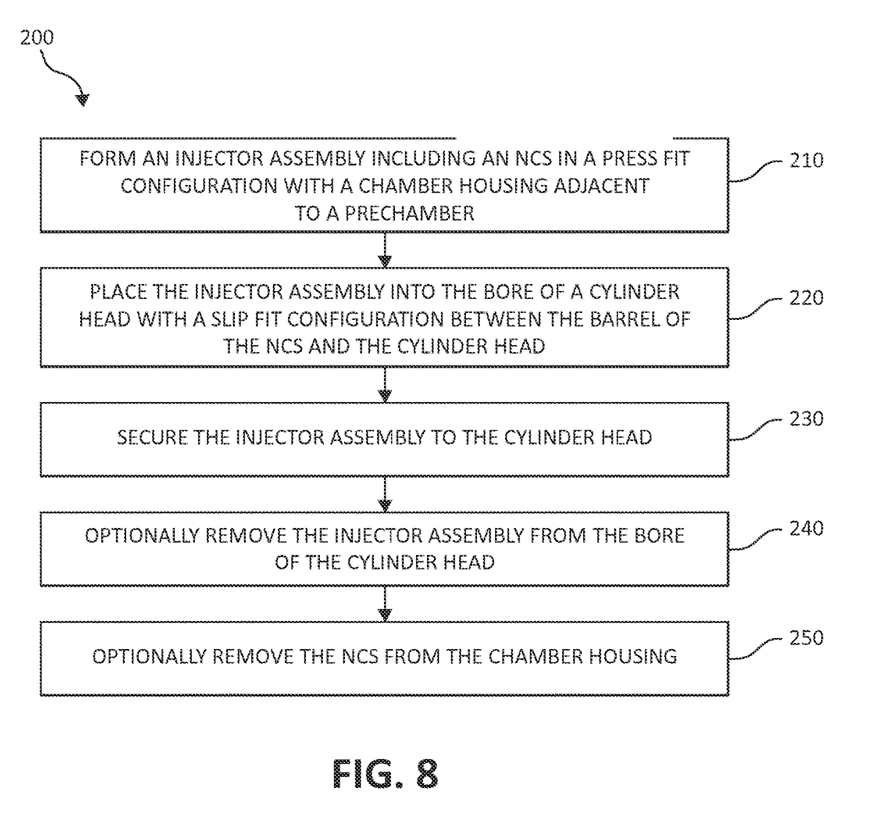
FIG. 8 is an illustration of a method of assembling and servicing cylinder of FIG. 1, according to some embodiments.

FIG. 8 is an illustration of an example method 200 of assembling and servicing a cylinder 10, 12 with the NCS 30 according to some embodiments. Method 200 is optionally utilized with example cylinder 10 or 12 described herein elsewhere. In operation 210, an injector assembly is formed including an NCS in a press fit configuration with a chamber housing adjacent to a prechamber. An example injector assembly is a spark-ignition injector assembly. An example prechamber is a permanent, passive prechamber (PPPC). In operation 220, the injector assembly is placed into the bore of a cylinder head with a slip fit configuration between the barrel of the NCS and the cylinder head. This forms a slip fit between the NCS barrel and the cylinder head. In operation 230, the injector assembly is secured to the cylinder head, for example, by a coupling assembly. An example coupling assembly clamps the injector assembly to the cylinder head. Greater clamping forces can increase metal-metal contact heat conduction, for example, between a brim of the NCS and the cylinder head. The injector assembly can be used during operation of an internal combustion engine utilizing a spark-ignition.

At the time of service, maintenance, or repair, operation 240 is optionally performed to remove the injector assembly from the bore of the cylinder head. Additionally, in operation 250, the NCS is optionally removed from the chamber housing, for example, by cutting or pulling the NCS free from the chamber housing.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. An assembly, comprising:
   an injector tip having a proximal end adjacent a spark plug, the injector tip including a prechamber and at least a portion of a chamber housing, the prechamber being defined by at least the portion of the chamber housing, and the chamber housing having a first thermal conductivity; and
   a nozzle combustion shield (NCS) including an inner surface, the NCS having a second thermal conductivity, the inner surface being in a press fit configuration with the chamber housing, wherein the second thermal conductivity of the NCS is greater than the first thermal conductivity of the chamber housing, and the NCS including a proximal end and a distal end, and both the proximal and distal ends of the NCS are positioned adjacent the injector tip, wherein the NCS proximal end is positioned adjacent the proximal end of the injector tip.

2. The assembly of claim 1, wherein the NCS further includes an outer surface, the inner and outer surfaces having no threads.

3. The assembly of claim 1, wherein the chamber housing includes a shoulder providing a proximal surface, the injector tip extending from the shoulder, the inner surface of the NCS directly contacting the shoulder and the injector tip.

4. The assembly of claim 3, wherein the NCS includes a barrel and a brim on an end of the barrel protruding outwardly, the NCS brim being in direct contact with the shoulder of the chamber housing.

5. The assembly of claim 4, wherein the NCS inner surface is in a press fit configuration with the injector tip.

6. The assembly of claim 5, further comprising a cylinder head including a bore and a proximal surface, the NCS barrel at least partially disposed in the cylinder head bore, the NCS barrel including an outer diameter in a slip fit configuration with the cylinder head, the brim of the NCS being in direct contact with the proximal surface of said cylinder head.

7. The assembly of claim 6, further comprising a spark plug housing engaged with the chamber housing, wherein the spark plug housing, the chamber housing, and the NCS are coupled to the cylinder head to form a combustion seal between the NCS and the cylinder head proximal surface.

8. The assembly of claim 6, wherein the cylinder head comprises a cooling jacket formed in the cylinder head adapted to contain a coolant for receiving heat from the cylinder head and the cooling jacket is disposed adjacent to the brim of the NCS to indirectly receive heat from the prechamber and the NCS at the cylinder head.

9. The assembly of claim 1, wherein the NCS comprises at least one of a copper material and a copper alloy material, and wherein the copper alloy comprises zirconium.

10. The assembly of claim 9, wherein the NCS comprises at least one of a C15000 alloy material and a C10200 alloy material.

11. The assembly of claim 9, wherein the NCS is made of a single material.

12. An assembly, comprising:
    an injector tip including a prechamber, the injector tip having a first thermal conductivity;
    a chamber housing integrally formed with the injector tip, the chamber housing houses at least a portion of a spark plug;
    a nozzle combustion shield (NCS) in a non-threaded press fit configuration with the injector tip, wherein the NCS has a second thermal conductivity is greater than the first thermal conductivity of the injector tip; and
    a cylinder head including a bore and a proximal surface, at least a portion of the NCS received in the cylinder head bore, the NCS being in a slip fit configuration with the cylinder head, wherein the NCS is in direct contact with the proximal surface.

13. The assembly of claim 12, wherein the NCS includes a brim and a barrel, the brim forming a combustion seal with the proximal surface of the cylinder head, the barrel being in a press fit configuration with the injector tip and being in a slip fit configuration with the cylinder head.

14. The assembly of claim 13, further comprising a spark plug housing, wherein the spark plug is disposed at least partially in the spark plug housing and at least partially in the chamber housing.

15. The assembly of claim 14, wherein the cylinder head comprises a cooling jacket disposed in the cylinder head to contain a coolant, the cooling jacket disposed to indirectly receive heat from the injector tip through the NCS and the cylinder head.

16. The assembly of claim 12, wherein the NCS comprises at least one of a C15000 alloy material and a C10200 alloy material.

17. A method, comprising:
    providing an injector tip having a prechamber and a first thermal conductivity;
    providing a chamber housing integrally formed with the injector tip, the chamber housing houses at least a portion of a spark plug;
    providing a nozzle combustion shield (NCS) including a barrel and a brim, the NCS having a second thermal conductivity greater than the first thermal conductivity of the injector tip; and
    fitting the NCS to the injector tip in a press fit configuration to form an injector assembly.

18. The method of claim 17, further comprising forming a slip fit between the NCS barrel and a cylinder head.

19. The method of claim 18, further including securing the injector assembly to the cylinder head to form a combustion seal between the NCS and the cylinder head.

20. The method of claim 19, further including removing the NCS barrel from the cylinder head and removing the NCS from the injector tip.

21. An assembly, comprising:
    an injector tip including a prechamber and at least a portion of a chamber housing, the prechamber being defined by at least the portion of the chamber housing, the chamber housing having a first thermal conductivity and integrally formed with the injector tip, the chamber housing houses at least a portion of a spark plug; and a nozzle combustion shield (NCS) including an inner surface, the NCS having a second thermal conductivity, the inner surface being in a press fit configuration with the chamber housing, wherein the second thermal conductivity of the NCS is greater than the first thermal conductivity of the chamber housing, and the NCS including a barrel generally extending vertically between a distal end and a proximal end of the NCS and a brim extending laterally outward from the proximal end of the NCS, and the distal end is positioned adjacent the injector tip.

22. The assembly of claim 21, wherein both the distal and proximal ends of the NCS are positioned adjacent the injector tip.

\* \* \* \* \*